United States Patent
Watando et al.

(10) Patent No.: US 10,544,252 B2
(45) Date of Patent: Jan. 28, 2020

(54) METHOD FOR TREATMENT OF CARBON DIOXIDE ABSORBING AGENT

(71) Applicant: KABUSHIKI KAISHA TOSHIBA, Tokyo (JP)

(72) Inventors: Hiroko Watando, Tokyo (JP); Takashi Kuboki, Tokyo (JP); Satoshi Saito, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/069,324

(22) Filed: Mar. 14, 2016

(65) Prior Publication Data

US 2016/0280839 A1    Sep. 29, 2016

(30) Foreign Application Priority Data

Mar. 23, 2015    (JP) .................. 2015-059679

(51) Int. Cl.
| | | |
|---|---|---|
| C08G 18/32 | (2006.01) | |
| C08G 18/76 | (2006.01) | |
| C08G 18/73 | (2006.01) | |
| C08G 18/48 | (2006.01) | |
| C08G 18/08 | (2006.01) | |

(52) U.S. Cl.
CPC ....... *C08G 18/3275* (2013.01); *C08G 18/088* (2013.01); *C08G 18/3281* (2013.01); *C08G 18/3293* (2013.01); *C08G 18/4825* (2013.01); *C08G 18/73* (2013.01); *C08G 18/7664* (2013.01); *C08G 18/7671* (2013.01)

(58) Field of Classification Search
CPC .. C08G 18/10; C08G 18/3275; C08G 18/088; C08G 18/4825; C08G 18/7671; C08G 18/73; C08G 18/7664; C08G 18/3293; C08G 18/3281
See application file for complete search history.

(56) References Cited

U.S. PATENT DOCUMENTS

| | | | |
|---|---|---|---|
| 4,649,162 A * | 3/1987 | Roche | B29B 7/7428 521/133 |
| 5,688,861 A | 11/1997 | Simroth et al. | |
| 6,489,373 B2 | 12/2002 | Kodama et al. | |
| 8,545,783 B2 | 10/2013 | Murai et al. | |
| 2004/0214964 A1* | 10/2004 | Kim | C08G 18/384 525/454 |
| 2009/0214651 A1* | 8/2009 | Fugmann | A61L 15/26 424/486 |
| 2012/0161071 A1 | 6/2012 | Murai et al. | |
| 2012/0217437 A1* | 8/2012 | Kondo | B01D 53/1475 252/184 |
| 2014/0024127 A1 | 1/2014 | Watando et al. | |

FOREIGN PATENT DOCUMENTS

| | | |
|---|---|---|
| GB | 2 058 739 B | 2/1983 |
| JP | S56-500201 A | 2/1981 |
| JP | 2000-169624 | 6/2000 |
| JP | 2001-81233 | 3/2001 |
| JP | 2001-81234 | 3/2001 |
| JP | 4279363 | 6/2009 |
| JP | 2012-30222 | 2/2012 |
| JP | 2012-143744 | 8/2012 |
| JP | 2012-143745 | 8/2012 |
| JP | 2012-179584 | 9/2012 |
| JP | 2012-245483 | 12/2012 |
| JP | 2014-20912 | 2/2014 |
| WO | WO 01/19907 | 3/2001 |
| WO | WO 01/19907 A1 | 3/2001 |

\* cited by examiner

*Primary Examiner* — Rabon A Sergent
(74) *Attorney, Agent, or Firm* — Finnegan, Henderson, Farabow, Garrett & Dunner, L.L.P.

(57) ABSTRACT

There is provided a method that can realize the treatment of an amine compound, a deterioration product thereof and the like in a simple and a low-cost manner. The method includes treating a carbon dioxide absorbing agent, comprising a step in which at least one carbon dioxide absorbing agent represented by OH—$R^2$—$NR^3$—$R^4$—OH or H—$NR^6$—$R^7$—$NR^8$—H into contact with a compound containing two or more isocyanate groups in its molecule to produce a solid containing a urethane bond or a urea bond. In the above formula, $R^2$, $R^3$, $R^4$, $R^6$, $R^7$, and $R^8$ each independently represent $C_vH_wO_xN_y$, wherein v, w, x, and y are $0 \leq v \leq 10$, $0 \leq w \leq 22$, $0 \leq x \leq 3$, and $0 \leq y \leq 3$, respectively.

2 Claims, No Drawings

METHOD FOR TREATMENT OF CARBON DIOXIDE ABSORBING AGENT

CROSS REFERENCE TO RELATED APPLICATIONS

This application is based upon and claims the benefit of priority from the prior Japanese Patent Application No. 2015-59679, filed on Mar. 23, 2015, the entire contents of which are incorporated herein by reference.

FIELD

Embodiments of the present invention relate to a method for treatment of a carbon dioxide absorbing agent.

BACKGROUND

In order to suppress global warming, a reduction in emission of carbon dioxide into the air has recently been demanded.

A recovery method utilizing a chemical adsorption method may be mentioned as one of techniques for separation, recovery, and storage (carbon capture and storage) (hereinafter often referred to as "CCS") and has played an important role in reducing carbon dioxide in combustion exhaust gases in boilers, for example, in thermal electric power stations, from the past.

The following techniques may be mentioned as typical CCS techniques. These techniques will be briefly described.

A combustion exhaust gas from a boiler is if necessary subjected to denitration, dust collection, desulfurization or the like and is then led into an absorption tower where the combustion exhaust gas is brought into contact with an absorbing solution. This allows $CO_2$ in the combustion exhaust gas to be absorbed in the absorbing solution to remove $CO_2$ from the combustion exhaust gas. The absorbing solution in which $CO_2$ has been absorbed is heated, for example, by a heat exchanger and is then led into a regeneration tower where $CO_2$ is released from the absorbing solution and recovered. On the other hand, the absorbing solution from which $CO_2$ has been released within the regeneration tower is circulated into the absorption tower and is reutilized for absorption of $CO_2$ in the combustion exhaust gas. An absorbing solution composed of an amine and water is suitable as an absorbing solution for use in such CCS techniques. In practicing CCS utilizing the chemical adsorption method, when operation is carried out in a plant for a long period of time, the absorbing solution containing the amine is deteriorated by heating and oxidation. The deterioration leads to a reduction in effective ingredients and the production of amine derivatives, organic acids, nitrosoamines derived from the ingredients of the absorbing solution.

Attention is needed so that amines constituting the absorbing solution, deterioration products thereof and the like are not leaked into an external environment from the absorption tower, the regeneration tower, and other CCS apparatuses. To this end, a method that recovers the amine constituting the absorbing solution and the deterioration products thereof, and a method that analyzes the recovered materials have been desired. In particular, for nitrosoamines that have been pointed out to be harm, further advanced recovery techniques and techniques for quantitative determination with a higher sensitivity have been demanded.

In the CCS techniques, the operation in a plant for a long period of time causes a deterioration in the amine absorbing solution by heating or oxidation. The deterioration often leads to a reduction in effective ingredients and production of amine derivatives, organic acids, nitrosoamines and the like. The absorbing solution containing these deterioration products is periodically replaced and, at the present time, is regenerated with an ion-exchange resin or subjected to combustion disposal. However, consideration is needed for the cost of disposal of a huge amount of amine compounds disposed and environments in disposal.

DETAILED DESCRIPTION

One aspect of the present invention relates to a method for treating a carbon dioxide absorbing agent, and an object of the present invention is to provide a method for the treatment of a carbon dioxide absorbing agent wherein amine compounds, deterioration products thereof and the like in the carbon dioxide absorbing agent can be treated in a simple and low-cost manner.

According to one aspect of the present invention, there is provided a method for treating a carbon dioxide absorbing agent, the method including reacting a carbon dioxide absorbing agent including one or more amines containing in a molecule thereof two or more amino groups or hydroxyl groups with a compound containing two or more isocyanate groups to produce a urethane compound, whereby a reduction in volume of and a reduced toxicity of an absorbing solution can be realized.

More specifically, an amine-containing carbon dioxide absorbing agent is brought into contact with a compound comprises two or more isocyanate groups in a molecule thereof to form a urethane bond and a urea bond between both the compounds and thus to form a polymerized compound. Amines containing a tri- or higher functional hydroxyl or amino group can form a solid crosslinked product that as such can be disposed. When an amine containing two or less in total of hydroxyl or amine groups in a molecule thereof is used, the use of a compound containing at least one trifunctional isocyanate can provide a crosslinked product.

The volume can be further reduced by distillation to remove water before the addition of the isocyanate.

Thus, according to one aspect of the present invention, there is provided a method for treating a carbon dioxide absorbing agent, comprising a step in which at least one carbon dioxide absorbing agent represented by OH—$R^2$—$NR^3$—$R^4$—OH or H—$NR^6$—$R^7$—$NR^8$—H wherein $R^2$, $R^3$, $R^4$, $R^6$, $R^7$, and $R^8$ each independently represent $C_vH_wO_xN_y$ wherein v, w, x, and y are $0 \le v \le 10$, $0 \le w \le 22$, $0 \le x \le 3$, and $0 \le y \le 3$, respectively is brought into contact with a compound containing two or more isocyanate groups in a molecule thereof to produce a solid containing a urethane bond or a urea bond.

In a preferred embodiment of the method for treating a carbon dioxide absorbing agent according to the one aspect of the present invention, the solid comprises a resin having the following structure (1), (2), or (3):

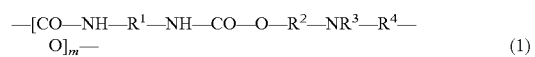  (1)

  (2)

  (3)

wherein $R^1$, $R^5$, $R^9$, and $R^{10}$ each independently represent $C_rH_sO_tN_u$ wherein r, s, t, and u are $0 \le r \le 200$, $0 \le s \le 402$, $0 \le t \le 50$, and $0 \le u \le 50$, respectively;

$R^2$, $R^3$, $R^4$, $R^6$, $R^7$, and $R^8$ each independently represent $C_vH_wO_xN_y$, wherein v, w, x, and y represent $0 \leq v \leq 10$, $0 \leq w \leq 22$, $0 \leq x \leq 3$, and $0 \leq y \leq 3$, respectively; and m, n, and p are $1 \leq m \leq 10000$, $0 \leq n \leq 2000$, and $1 \leq p \leq 10000$, respectively.

In another preferred embodiment of the method for treating a carbon dioxide absorbing agent according to the one aspect of the present invention, at least one carbon dioxide absorbing agent represented by OH—$R^2$—$NR^3$—$R^4$—OH or H—$NR^6$—$R^7$—$NR^8$—H is brought into contact with the compound containing two or more isocyanate groups in a molecule thereof in such a state that the concentration of the carbon dioxide absorbing agent is 20% by weight to 95% by weight.

Carbon Dioxide Absorbing Agent

In the method for treating a carbon dioxide absorbing agent according to the one aspect of the present invention, the carbon dioxide absorbing agent treated is at least one carbon dioxide absorbing agent represented by OH—$R^2$—$NR^3$—$R^4$—OH or H—$NR^6$—$R^7$—$NR^8$—H. These carbon dioxide absorbing agent may be used solely or as a mixture of two or more of them.
wherein $R^2$, $R^3$, and $R^4$ each independently represent $C_sH_tO_u$ wherein s, t, and u are $0 \leq s \leq 100$, $0 \leq t \leq 202$, and $0 \leq u \leq 30$, respectively; and $R^6$, $R^7$, and $R^8$ each independently represent $C_vH_wO_xN_y$ wherein v, w, x, and y represent $0 \leq v \leq 10$, $0 \leq w \leq 22$, $0 \leq x \leq 3$, and $0 \leq y \leq 3$, respectively, provided that $R^2$, $R^3$, $R^4$, $R^6$, $R^7$, and $R^8$ may be the same as or different from each other and v, w, x, and y may be the same as or different from each other.

The carbon dioxide absorbing agent in the one aspect of the present invention may contain water in addition to the amine. The carbon dioxide absorbing agent (that is, at least one carbon dioxide absorbing agent represented by OH—$R^2$—$NR^3$—$R^4$—OH or H—$NR^6$—$R^7$—$NR^8$—H) is preferably brought into contact with the compound containing two or more isocyanate groups in a molecule thereof in such a state that the concentration of the carbon dioxide absorbing agent is 20% by weight to 95% by weight. When the concentration of the carbon dioxide absorbing agent is less than 20% by weight, difficulties are experienced in achieving a high absorbing capability. On the other hand, when the concentration of the carbon dioxide absorbing agent is more than 95% by weight, the absorbing capability can be maintained, but on the other hand, the viscosity is increased, resulting in lowered handleability. The concentration of the carbon dioxide absorbing agent is particularly preferably 35% by weight to 70% by weight.

The carbon dioxide absorbing agent in the one aspect of the present invention, when used in the recovery of carbon dioxide (for example, used in <Method for the recovery of carbon dioxide> that will be described later), other solvents other than water in addition to the amine may be contained. Specific examples of such solvents include methanol, ethanol, 2-propanol, and ammonia. Nitrosoamines are mainly based on a deterioration or decomposition of the carbon dioxide absorbing agent as a result of repeated use of the carbon dioxide absorbing agent in the method for the recovery of carbon dioxide that will be described later. Specifically, nitrosoamines include, for example, N-nitrosodiethanolamine, N-nitrosopiperazine, N-nitromethylaminoethanol, N-nitrosoethylaminoethanol, N-nitrosoisopropylaminoethanol, N-nitrosodimethylamine, N-nitrosomethylethylamine, and N-nitrosodiethylamine. These solvents may be used solely or as a mixture of two or more of them.

When two or more amines are contained, the proportion of the amount of primary amines to the total amount of the amines is preferably 50% by weight to 98% by weight, particularly preferably 70% by weight to 98% by weight. When three or more amines are contained, the proportion of the amount of secondary and tertiary amines to the total amount of the amines may be any one.

Examples of specific amines include:
(i) monoamines, for example, monoethanolamine, 2-amino-1-propanol, 3-amino-1-propanol, 1-amino-2-propanol, 2-amino-1-butanol, 3-amino-1-butanol, 4-amino-1-butanol, 2-amino-2-methyl-1-propanol, 2-amino-2-ethyl-1-propanol, ethylenediamine, propylenediamine, and ethylamine,
(ii) diamines, for example, 2-methylaminoethanol, 2-ethylaminoethanol, diethanolamine, hydroxyethylhydroxypropylamine, dipropanolamine, isopropylaminoethanol, and 3-methylamine-1,2-propanediol,
(iii) triamines, for example, dimethylaminoethanol, diethylaminoethanol, methyldiethanolamine, triethanolamine, 3-(dimethylamino)-1,2-propanediol, 2-{[2-(dimethylamino)ethyl]methylamino}ethanol, and N,N,N',N'-tetramethylethylenediamine, and
(iv) cycloamines, for example, piperizine, piperazine, 1-methylpiperazine, 2-methylpiperazine, 1,4-dimethylpiperazine, pyrrolidine, 1-methylpyrrolidine, 2-methylpyrrolidine, 1,4-diazabicyclo[2,2,2]octane, and morpholine. Other aliphatic amine, polyamine, cycloamine, and alkanolamine compounds are also possible.

Specific examples of particularly preferred amine compounds in the carbon dioxide absorbing agent in an embodiment of the present invention include compounds selected from the group consisting of diethanolamine, N,N'-dihydroxyethylpiperazine, dipropanolamine, methyldiethanolamine, ethylaminodiethanol, isopropylaminodiethanol, triethanolamine, piperazine, 2-methylpiperazine, 2,4-dimethylpiperazine, ethylenediamine, diethylenetriamine, and triethylenetetramine.

The presence of an amine containing two or more hydroxyl groups as a primary amine and an amine containing two or more amino groups as a secondary amine among the above amine compounds in the absorbing agent is preferred from the viewpoints of an absorbing capability, liquidity of the absorbing solution, and treatment with an isocyanate.

Further, the absorbing solution used in the method for the recovery of carbon dioxide in an aspect of the present invention may if necessary contain antioxidants, pH adjustors, antifoaming agents, preservatives, anticorrosives, and other compounds at any desired ratio.

If necessary, antioxidants, pH adjustors, antifoaming agents, preservatives, anticorrosives, and other compounds may be contained at any desired ratio as additives to the carbon dioxide absorbing agent. Further, various amine derivatives and nitrosoamines that are produced as a result of heating and oxidative deterioration of the carbon dioxide absorbing agent, as well as dust, dust coal, SOx, and NOx are sometimes contained.

According to the method for the treatment of a carbon dioxide absorbing agent in an embodiment of the present invention, nitrosoamines may also be simultaneously treated with the carbon dioxide absorbing agent in the same treatment and same procedure as the treatment of the carbon dioxide absorbing agent.

When the method for the treatment of a carbon dioxide absorbing agent in an embodiment of the present invention is applied to the carbon dioxide absorbing agent containing nitrosoamine, a solid having a structure containing a urethane bond or a urea bond represented by —[CO—NH—R$^1$—NH—CO—O—R$^2$—NR$^3$—R$^4$—O]$_m$—    (1)

—[CO—NH—R$^5$—NH—CO—NR$^6$—R$^7$—NR$^8$]$_n$—    (2)

—[CO—NH—R$^9$—NH—CO—NH—R$^{10}$H—CO]$_p$—    (3)

—CO—NH—R$^{11}$—NH—CO—NR$^{12}$—R$^{13}$—N—NO    (4)

wherein R$^1$, R$^5$, R$^9$, R$^{10}$, and R$^{11}$ each independently represent C$_r$H$_s$O$_t$N$_u$ wherein r, s, t, and u are 0≤r≤200, 0≤s≤402, 0≤t≤50, and 0≤u≤50, respectively;

R$^2$, R$^3$, R$^4$, R$^6$, R$^7$, R$^8$, R$^{12}$, and R$^{13}$ each independently represent C$_v$H$_w$O$_x$N$_y$, wherein v, w, x, and y represent 0≤v≤10, 0≤w≤22, 0≤x≤3, and 0≤y≤3, respectively; and m, n, and p are 1≤m≤10000, 0≤n≤2000, and 1≤p≤10000, respectively.

Isocyanate Group-Containing Compounds

Isocyanate group-containing compounds are not particularly limited as long as these compounds contain two or more isocyanate groups in a molecule thereof and, when mixed with a predetermined carbon dioxide absorbing agent, produce solids containing a urethane bond or a urea bond, preferably solids comprises a resin having the structure (1), (2), or (3). These resin having the structure may be used solely or as a mixture of two or more of them.

Specific preferred examples of such compounds include toluene diisocyanate (TDI), diphenylmethane diisocyanate (MDI), polymethylene polyphenyl polyisocyanate (polymeric MDI), 1,6-hexamethylene diisocyanate (HDI), 2,2,4 (2,4,4)-trimethylhexamethylene diisocyanate (HDI), 2,2,4 (2,4,4)-trimethylhexamethylene diisocyanate (TMDI), p-phenylene diisocyanate (PPDI), 4,4'-dicyclohexylmethane diisocyanate(HMDI), 3,3'-(dimethyldiphenyl 4,4'-diisocyanate (TODI), dianisidine diisocyanate (DADI), m-xylene diisocyanate (XDI), tetramethylxylene diisocyanate (TMXDI), isophorone diisocyanate (IPDI), 1,5-naphthalene diisocyanate (NDI), trans-1,4-cyclohexyl diisocyanate (CHDI), dimethyltriphenylmethane tetraisocyanate, triphenylmethane triisocyanate, tris(isocyanate phenyl) thiophosphate, modified TDIs, and modified MDIs. These substances may be used solely or as a mixture of two or more of them.

Among them, particularly preferred compounds include diphenylmethane diisocyanate (MDI), toluene diisocyanate (TDI), polymethylene polyphenyl polyisocyanate (polymeric MDI), 1,6-hexamethylene diisocyanate (HDI), 4,4'-dicyclohexylmethane diisocyanate (HMDI), and modification products thereof. In an embodiment of the present invention, diphenylmethane diisocyanate (MDI), polymeric MDI, and modification products thereof are particularly preferred. Preferred modified MDIs include diphenylmethane diisocyanate (MDI), high-molecular-weight isocyantes obtained by polymerizing diphenylmethane diisocyanate (MDI) and polyols, such as polypropylene glycol, and polynuclear compounds of diphenylmethane diisocyanate (MDI), and mixtures of MDI with modified MDI.

Method for Treatment of Carbon Dioxide Absorbing Agent

In an embodiment of the present invention, the method for treatment of a carbon dioxide absorbing agent is not particularly limited as long as, in the method, a predetermined carbon dioxide absorbing agent can be brought into contact with a compound containing two or more isocyanate groups in a molecule thereof to produce a solid containing a urethane bond or a urea bond, preferably a solid containing a resin having the following structure (1), (2), or (3).

—[CO—NH—R$^1$—NH—CO—O—R$^2$—NR$^3$—R$^4$—O]$_m$—    (1)

—[CO—NH—R$^5$—NH—CO—NR$^6$—R$^7$—NR$^8$]$_n$—    (2)

—[CO—NH—R$^9$—NH—CO—NH—R$^{10}$H—CO]$_p$—    (3)

wherein R$^1$, R$^5$, R$^9$, and R$^{10}$ each independently represent C$_r$H$_s$O$_t$N$_u$ wherein r, s, t, and u are 0≤r≤200, 0≤s≤402, 0≤t≤50, and 0≤u≤50, respectively;

R$^2$, R$^3$, R$^4$, R$^6$, R$^7$, and R$^8$ each independently represent C$_v$H$_w$O$_x$N$_y$, wherein v, w, x, and y represent 0≤v≤10, 0≤w≤22, 0≤x≤3, and 0≤y≤3, respectively; and m, n, and p are 1≤m≤10000, 0≤n≤2000, and 1≤p≤10000, respectively.

r is preferably 6≤r≤150, particularly preferably 6≤r≤130.
s is preferably 1≤s≤300, particularly preferably 4≤s≤100.
t is preferably 0≤t≤30, particularly preferably 0≤t≤20.
u is preferably 0≤u≤30, particularly preferably 0≤u≤20.
v is preferably 0≤v≤8, particularly preferably 1≤v≤5.
w is preferably 0≤w≤18, particularly preferably 2≤w≤12.
x is preferably 0≤x≤2.
y is preferably 0≤y≤2.
m is preferably 1≤m≤8000, particularly preferably 2≤m≤5000.
n is preferably 1≤n≤1500, particularly preferably 1≤n≤100.
p is preferably 1≤p≤8000, particularly preferably 2≤5≤5000.
m to y may be determined by FT-IR, GC/MS, an elementary analysis, GPC measurement, and high-performance liquid chromatography.

Polyurethane in which m to y are in the above-defined range holds amine compounds derived from the carbon dioxide absorbing agent, deterioration products thereof and the like without causing liberation thereof.

According to a specific example of preferred methods for treatment of a carbon dioxide absorbing agent in an embodiment of the present invention, the solid can be obtained by adding an isocyanate group-containing compound to the carbon dioxide absorbing agent so that the amount in terms of molar ratio of the isocyanate group to the whole amino group and hydroxyl group in the carbon dioxide absorbing agent is preferably not less than 0.8, particularly preferably 1 to 20, still more preferably 1 to 15, mixing them with a stirrer, and curing the mixture at room temperature to 150° C. for approximately a few min to 12 hr. When the amount of the isocyanate group is in the above-defined range, advantageously, the whole amount of the compound can easily be cured. When the molar ratio of the isocyanate grope is less than 0.8, there is possibility that a large amount of the amine remaining unreacted remains and is eluted. The amount of the whole amino group in the carbon dioxide may be determined, for example, by amine value measurement, elementary analysis, and FT-IR.

Here the room temperature refers to a temperature of 20° C.±15° C. In the method for treatment of a carbon dioxide absorbing agent, there is no need for the treatment temperature to be always constant in the above-defined temperature range (that is, in a range of room temperature to 150° C.), and the treatment temperature may vary in the above-defined temperature range. Further, the temperature may be temporarily outside the above-defined range as long as the object and effect of the present invention can be attained.

The stirring may be carried out by any method and means. The method and means are not particularly limited, and, for example, apparatuses or methods commonly used for stirring such as vaned stirrers, planetary centrifugal mixers, online-type stirrers, and magnetic stirrers can be applied.

A large amount of water is contained, preferably, the water is removed before the addition of the isocyanate-containing compound to such an extent that the content of water is not more than 10% by weight in the carbon dioxide absorbing agent, for example, from the viewpoints of cost and reaction rate. The method for the removal of water is not particularly limited, and commonly known dehydration methods such as distillation and use of dehydrating agents may be used.

Specific Examples of Method for Recovery of Carbon Dioxide, CCS

Specific examples of preferred carbon dioxide absorbing agents to which the method for the treatment of a carbon dioxide absorbing agent in an embodiment of the present invention can be applied include those used in a method for the recovery of carbon dioxide, comprising steps (i) and (ii):
step (i): a gas comprising carbon dioxide is contacted with an absorbing solution comprising an amine and water in order to absorb carbon dioxide in the absorbing solution; and
step (ii): the carbon dioxide absorbed in the carbon dioxide absorbing solution comprising the amine and water in step (i).

At the step (i), a gas comprising carbon dioxide, for example, a combustion gas of a fossil fuel (for example, coal, petroleum, or LNG) is brought into contact with an absorbing solution containing an amine and water to absorb carbon dioxide in the absorbing solution. In this case, what is required is that the gas containing carbon dioxide can come into contact with the absorbing solution composed of the amine and water, and existing carbon dioxide absorbing facilities such as gas dispersion-type absorbing apparatuses with bubble agitation tanks or bubble columns, and liquid dispersion-type absorbing apparatuses with spray towers, spray chambers, scrubbers, wetted wall columns, or packed columns can be used. Among them, carbon dioxide absorption columns filled with fillers are preferred from the viewpoint of a carbon dioxide absorption efficiency.

The reaction temperature in the recovery of carbon dioxide may be any temperature as long as carbon dioxide can be absorbed. The reaction temperature, however, is preferably 25° C. to 70° C., particularly preferably 30° C. to 60° C. from the viewpoints of the rate and efficiency of carbon dioxide absorption.

At the step (ii), carbon dioxide absorbed in the absorbing solution comprising the amine and water at the step (i) is dissociated from the absorbing solution.

Carbon dioxide is dissociated from the absorbing solution composed of the amine and water and comprising carbon dioxide. Methods for the dissociation of carbon dioxide include, but are not limited to, evacuation, heating and membrane separation. Among them, the method using the heat treatment can realize easy dissociation of carbon dioxide. The temperature in this case is not particularly limited as long as carbon dioxide can be dissociated. The temperature, however, is preferably 40° C. to 150° C., particularly preferably 70° C. to 140° C.

In this embodiment, the absorbing solution from which carbon dioxide has been dissociated can again absorb carbon dioxide and can be repeatedly used in the step of recovering carbon dioxide.

Specific examples of "carbon dioxide absorbing agent" and "amine" in the method for the treatment of the carbon dioxide absorbing agent in an embodiment of the present invention include those used in the method for the recovery of carbon dioxide including the step (i) and the step (ii).

EXAMPLES

The following Examples further illustrate details of preferred specific examples among methods for the treatment of carbon dioxide absorbing agents in embodiments of the present invention. Accordingly, it is needless to say that the present invention should not be construed to fall within only the scope specifically disclosed in the following Examples.

Example 1

MDI was added to a carbon dioxide absorbing agent that was composed mainly of 50% by weight of diethanolamine, 10% by weight of piperazine, and 40% by weight of water and was continuously used in a carbon dioxide recovery apparatus for 1000 hr so that the molar ratio of the isocyanate group to the amino group or the hydroxyl group in the amine was 10:1, followed by mixing at room temperature with a stick-type stirrer for 5 min. Thereafter, the mixture was cured at room temperature for 8 hr to obtain a solid resin having a urethane bond.

Example 2

MDI was added to a carbon dioxide absorbing agent that was composed mainly of 50% by weight of methyldiethanolamine, 10% by weight of piperazine, and 40% by weight of water and was continuously used in a carbon dioxide recovery apparatus for 1000 hr so that the molar ratio of the isocyanate group to the amino group or the hydroxyl group in the amine was 10:1, followed by mixing at room temperature with a stick-type stirrer for 5 min. Thereafter, the mixture was cured at room temperature for 8 hr to obtain a solid resin having a urethane bond.

Example 3

MDI was added to a carbon dioxide absorbing agent that was composed mainly of 50% by weight of N,N'-dihydroxyethylpiperazine, 10% by weight of piperazine, and 40% by weight of water and was continuously used in a carbon dioxide recovery apparatus for 1000 hr so that the molar ratio of the isocyanate group to the amino group or the hydroxyl group in the amine was 10:1, followed by mixing at room temperature with a stick-type stirrer for 5 min. Thereafter, the mixture was cured at room temperature for 8 hr to obtain a solid resin having a urethane bond.

Example 4

MDI was added to a carbon dioxide absorbing agent that was composed mainly of 50% by weight of triethanolamine, 10% by weight of piperazine, and 40% by weight of water and was continuously used in a carbon dioxide recovery apparatus for 1000 hr so that the molar ratio of the isocyanate group to the amino group or the hydroxyl group in the amine was 10:1, followed by mixing at room temperature with a stick-type stirrer for 5 min. Thereafter, the mixture was cured at room temperature for 8 hr to obtain a solid resin having a urethane bond.

Example 5

MDI was added to a carbon dioxide absorbing agent that was composed mainly of 50% by weight of diethanolamine, 10% by weight of piperazine, and 40% by weight of water and was continuously used in a carbon dioxide recovery apparatus for 5000 hr so that the molar ratio of the isocyanate group to the amino group or the hydroxyl group in the amine was 10:1, followed by mixing at room temperature with a stick-type stirrer for 5 min. Thereafter, the mixture was cured at room temperature for 8 hr to obtain a solid resin having a urethane bond.

Example 6

MDI was added to a carbon dioxide absorbing agent that was composed mainly of 50% by weight of methyldiethanolamine, 10% by weight of piperazine, and 40% by weight of water and was continuously used in a carbon dioxide recovery apparatus for 5000 hr so that the molar ratio of the isocyanate group to the amino group or the hydroxyl group in the amine was 10:1, followed by mixing at room temperature with a stick-type stirrer for 5 min. Thereafter, the mixture was cured at room temperature for 8 hr to obtain a solid resin having a urethane bond.

Example 7

MDI was added to a carbon dioxide absorbing agent that was composed mainly of 50% by weight of N,N'-dihydroxyethylpiperazine, 10% by weight of piperazine, and 40% by weight of water and was continuously used in a carbon dioxide recovery apparatus for 5000 hr so that the molar ratio of the isocyanate group to the amino group or the hydroxyl group in the amine was 10:1, followed by mixing at room temperature with a stick-type stirrer for 5 min. Thereafter, the mixture was cured at room temperature for 8 hr to obtain a solid resin having a urethane bond.

Example 8

MDI was added to a carbon dioxide absorbing agent that was composed mainly of 50% by weight of triethanolamine, 10% by weight of piperazine, and 40% by weight of water and was continuously used in a carbon dioxide recovery apparatus for 5000 hr so that the molar ratio of the isocyanate group to the amino group or the hydroxyl group in the amine was 10:1, followed by mixing at room temperature with a stick-type stirrer for 5 min. Thereafter, the mixture was cured at room temperature for 8 hr to obtain a solid resin having a urethane bond.

Example 9

MDI was added to a carbon dioxide absorbing agent that was composed mainly of 50% by weight of diethanolamine, 10% by weight of piperazine, 1% by weight of N-nitrosodiethanolamine, 1% by weight of N-nitrosopiperazine, and 38% by weight of water and was continuously used in a carbon dioxide recovery apparatus for 1000 hr so that the molar ratio of the isocyanate group to the amino group or the hydroxyl group in the amine was 10:1, followed by mixing at room temperature with a stick-type stirrer for 5 min. Thereafter, the mixture was cured at room temperature for 8 hr to obtain a solid resin having a urethane bond. Even when the urethane resin thus produced was immersed in an organic solvent or water, the elution of amine and nitrosoamine was not observed.

Example 10

MDI was added to a carbon dioxide absorbing agent that was composed mainly of 50% by weight of methyldiethanolamine, 10% by weight of piperazine, 1% by weight of N-nitrosodiethanolamine, 1% by weight of N-nitrosopiperazine, and 38% by weight of water and was continuously used in a carbon dioxide recovery apparatus for 1000 hr so that the molar ratio of the isocyanate group to the amino group or the hydroxyl group in the amine was 10:1, followed by mixing at room temperature with a stick-type stirrer for 5 min. Thereafter, the mixture was cured at room temperature for 8 hr to obtain a solid resin having a urethane bond. Even when the urethane resin thus produced was immersed in an organic solvent or water, the elution of amine and nitrosoamine was not observed.

Example 11

MDI was added to a carbon dioxide absorbing agent that was composed mainly of 50% by weight of diethanolamine, 10% by weight of piperazine, and 40% by weight of water and was continuously used in a carbon dioxide recovery apparatus for 1000 hr so that the molar ratio of the isocyanate group to the amino group or the hydroxyl group in the amine was 10:1, followed by mixing at room temperature with a stick-type stirrer for 5 min. Thereafter, the mixture was cured at 80° C. for 4 hr to obtain a solid resin having a urethane bond.

Example 12

A carbon dioxide absorbing agent that was composed mainly of 50% by weight of diethanolamine, 10% by weight of piperazine, and 40% by weight of water and was continuously used in a carbon dioxide recovery apparatus for 1000 hr was distilled at 150° C. for 2 hr to obtain an aqueous amine solution composed of 50 parts by weight of diethanolamine, 10 parts by weight of piperazine, and 5 parts by weight of water. MDI was added to the aqueous amine solution so that the molar ratio of the isocyanate group to the amino group or the hydroxyl group in the amine was 5:1, followed by mixing at room temperature with a stick-type stirrer for 5 min. Thereafter, the mixture was cured at room temperature for 8 hr to obtain a solid resin having a urethane bond.

Example 13

MDI was added to a carbon dioxide absorbing agent that was composed mainly of 50% by weight of methyldiethanolamine, 10% by weight of piperazine, and 40% by weight of water and was continuously used in a carbon dioxide recovery apparatus for 1000 hr so that the molar ratio of the isocyanate group to the amino group or the hydroxyl group in the amine was 10:1, followed by mixing at room temperature with a stick-type stirrer for 5 min. Thereafter, the mixture was cured at room temperature for 8 hr to obtain a solid resin having a urethane bond.

Example 14

A carbon dioxide absorbing agent that was composed mainly of 50% by weight of methyldiethanolamine, 10% by weight of piperazine, and 40% by weight of water and was continuously used in a carbon dioxide recovery apparatus for 1000 hr was distilled at 150° C. for 2 hr to obtain an aqueous amine solution composed of 50 parts by weight of methyldiethanolamine, 10 parts by weight of piperazine, and 5 parts by weight of water. MDI was added to the aqueous amine solution so that the molar ratio of the isocyanate group to the amino group or the hydroxyl group in the amine was 5:1, followed by mixing at room temperature with a stick-type stirrer for 5 min. Thereafter, the mixture was cured at room temperature for 8 hr to obtain a solid resin having a urethane bond.

Example 15

Polymeric MDI was added to a carbon dioxide absorbing agent that was composed mainly of 50% by weight of methyldiethanolamine, 10% by weight of piperazine, and 40% by weight of water and was continuously used in a carbon dioxide recovery apparatus for 1000 hr so that the molar ratio of the isocyanate group to the amino group or the hydroxyl group in the amine was 10:1, followed by mixing at room temperature with a stick-type stirrer for 5 min. Thereafter, the mixture was cured at room temperature for 8 hr to obtain a solid resin having a urethane bond.

Example 16

1,6-Hexamethylene diisocyanate (HDI) was added to a carbon dioxide absorbing agent that was composed mainly of 50% by weight of methyldiethanolamine, 10% by weight of piperazine, and 40% by weight of water and was continuously used in a carbon dioxide recovery apparatus for 1000 hr so that the molar ratio of the isocyanate group to the amino group or the hydroxyl group in the amine was 10:1, followed by mixing at room temperature with a stick-type stirrer for 5 min. Thereafter, the mixture was cured at room temperature for 8 hr to obtain a solid resin having a urethane bond.

Example 17

Modified MDI composed of MDI and a polymer of MDI and polypropylene glycol was added to a carbon dioxide absorbing agent that was composed mainly of 50% by weight of methyldiethanolamine, 10% by weight of piperazine, and 40% by weight of water and was continuously used in a carbon dioxide recovery apparatus for 1000 hr so that the molar ratio of the isocyanate group to the amino group or the hydroxyl group in the amine was 10:1, followed by mixing at room temperature with a stick-type stirrer for 5 min. Thereafter, the mixture was cured at room temperature for 8 hr to obtain a solid resin having a urethane bond.

Comparative Example 1 (Where the Addition Amount of Isocyanate is Small)

MDI was added to a carbon dioxide absorbing agent that was composed mainly of 50% by weight of diethylamine, 10% by weight of piperizine, and 40% by weight of water and was continuously used in a carbon dioxide recovery apparatus for 1000 hr so that the molar ratio of the isocyanate group to the amino group or the hydroxyl group in the amine was 10:1, followed by mixing at room temperature with a stick-type stirrer for 5 min. Thereafter, the mixture was cured at room temperature for 8 hr. As a result, a solid resin was not obtained although an increase in viscosity was observed.

Comparative Example 2

Octadecyl isocyante was added to a carbon dioxide absorbing agent that was composed mainly of 50% by weight of diethanolamine, 10% by weight of piperizine, and 40% by weight of water and was continuously used in a carbon dioxide recovery apparatus for 1000 hr so that the molar ratio of the isocyanate group to the amino group or the hydroxyl group in the amine was 10:1, followed by mixing at room temperature with a stick-type stirrer for 5 min. Thereafter, the mixture was cured at 80° C. for 8 hr. As a result, a solid resin was not obtained although an increase in viscosity was observed.

Comparative Example 3

MDI was added to a carbon dioxide absorbing agent that was composed mainly of 50% by weight of monoethanolamine, 10% by weight of piperizine, and 40% by weight of water and was continuously used in a carbon dioxide recovery apparatus for 1000 hr so that the molar ratio of the isocyanate group to the amino group or the hydroxyl group in the amine was 10:1, followed by mixing at room temperature with a stick-type stirrer for 5 min. Thereafter, the mixture was cured at 80° C. for 8 hr. As a result, a solid resin was not obtained although an increase in viscosity was observed.

Some embodiments of the present invention have been described. The method for the treatment of a carbon dioxide absorbing agent in an embodiment of the present invention includes bringing at least one carbon dioxide absorbing agent represented by $OH-R^2-NR^3-R^4-OH$ or $H-NR^6-R^7-NR^8-H$ into contact with a compound containing two or more isocyanate groups in a molecule thereof to produce a solid having a structure having a urethane bond or a urea bond represented by a predetermined structure, and, thus, can treat an amine compound in the carbon dioxide absorbing agent, deterioration products thereof and the like in a simple and low-cost manner.

The invention claimed is:

1. A method for detoxifying a carbon dioxide absorbing solution comprising water, at least one carbon dioxide absorbing agent, and nitrosoamines, wherein the nitrosoamines are generated by deterioration or decomposition of the at least one carbon dioxide absorbing agent as a result of repeated use of the at least one carbon dioxide absorbing agent in a recovery process of carbon dioxide, the recovery process comprising:
  contacting a gas comprising the carbon dioxide with the carbon dioxide absorbing solution to absorb the carbon dioxide in the carbon dioxide absorbing solution; and
  releasing the absorbed carbon dioxide from the carbon dioxide absorbing solution,
  the method for detoxifying the carbon dioxide absorbing solution comprising:
  bringing the carbon dioxide absorbing solution containing the nitrosamines into contact with a compound containing two or more isocyanate groups in its molecule, when a concentration of the at least one carbon dioxide absorbing agent in the carbon dioxide absorbing solution is in the range of 20% by weight to 96% by weight, thereby to form at least one of a urethane bond or a urea bond (i) between at least one carbon dioxide absorbing agent and the compound containing two or more isocyanate groups in its molecule, and (ii) between the nitrosamines and the compound containing two or more isocyanate groups in its molecule, and thus to form a polymerized compound that prevents elution of the nitrosoamines, whereby reducing toxicity of the carbon dioxide absorbing solution caused by the nitrosoamines, wherein the at least one carbon dioxide absorbing agent comprises a compound selected from a group consisting of diethanolamines, N,N'-dihydroxyethylpiperazine, dipropanolamine, methyldiethanolamine, ethylaminodiethanol, isopropyiaminodiethanol, triethanolamine, piperazine, 2-methylpiperazine, 2,4-dimethylpiperazine, ethylenediamine, diethylenetriamine, and triethylenetetramine.

2. The method according to claim 1, wherein, before the carbon dioxide absorbing solution comes in contact with the compound containing two or more isocyanate groups in its molecule, water is partially removed from the carbon dioxide absorbing solution so that the content of water in the carbon dioxide absorbing solution is not more than 10% by weight.

* * * * *